United States Patent
Castoe

[11] 3,915,431
[45] Oct. 28, 1975

[54] CAMBER AND CASTER ADJUSTMENT DEVICE

[75] Inventor: John H. Castoe, Sunland, Calif.

[73] Assignee: Branick Manufacturing Corporation, Fargo, N. Dak.

[22] Filed: Nov. 5, 1973

[21] Appl. No.: 412,609

[52] U.S. Cl. .................. 254/131; 81/3 R
[51] Int. Cl.² ........................... B66F 15/00
[58] Field of Search ........ 81/3 R; 254/131, 130, 25; 7/12; 29/267

[56] References Cited
UNITED STATES PATENTS

| | | | |
|---|---|---|---|
| 949,337 | 2/1910 | Trogner | 254/25 |
| 1,508,489 | 9/1924 | Vlchek | 254/25 |
| 2,135,065 | 11/1938 | Wick | 254/131 |
| 2,698,161 | 12/1954 | Kirby, Sr. | 254/130 |

*Primary Examiner*—Al Lawrence Smith
*Assistant Examiner*—Roscoe V. Parker
*Attorney, Agent, or Firm*—Roy E. Petherbridge; Robert L. Lindgren; Edward D. Gilhooly

[57] ABSTRACT

A camber and caster adjustment device having an elongated contact member for contacting the upper inner arm or shaft of a vehicle wheel assembly. A fulcrum member extends at an obtuse angle from the contact member and rests upon a fulcrum point of the vehicle during use of the device. An elongated handle extends from an end of the fulcrum member remote the contact member, and is moved to apply camber and caster adjustment forces by the contact member to the wheel assembly.

10 Claims, 5 Drawing Figures

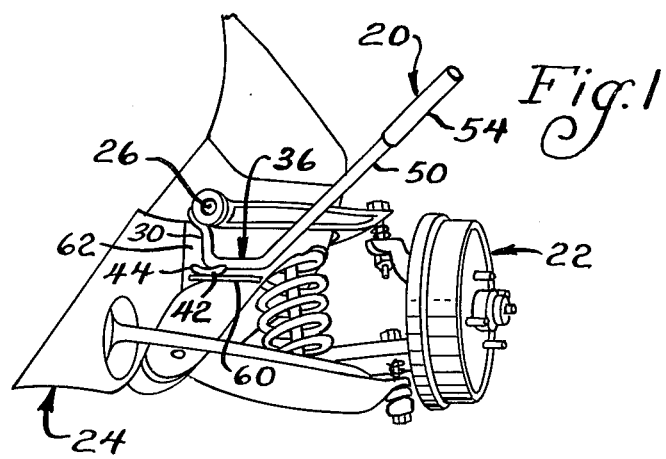
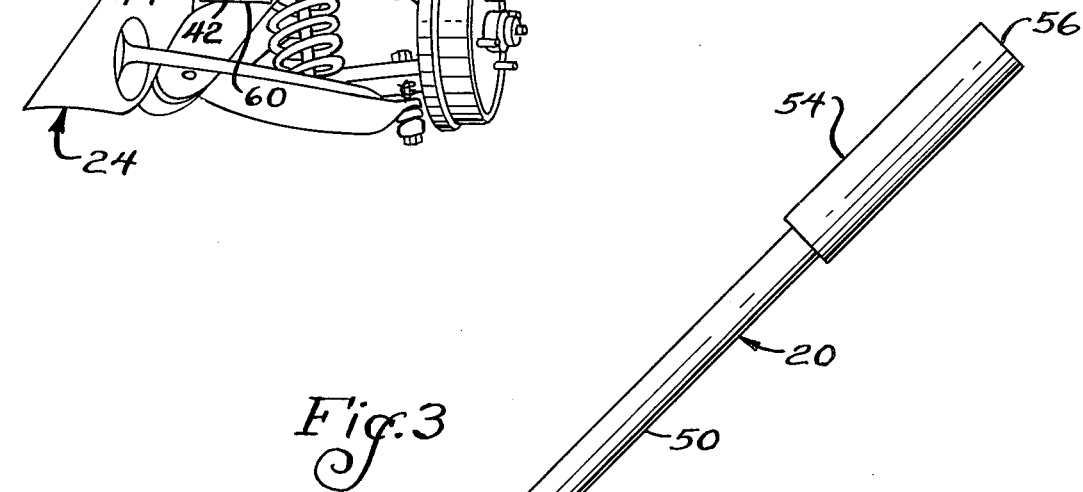
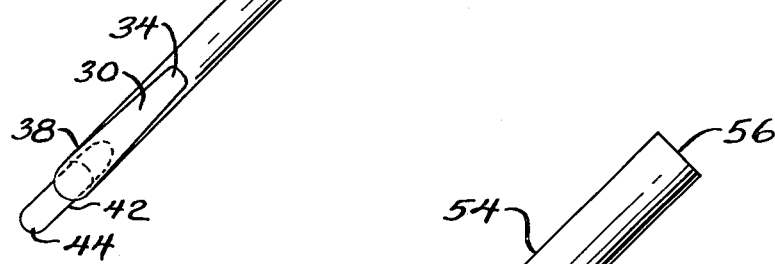
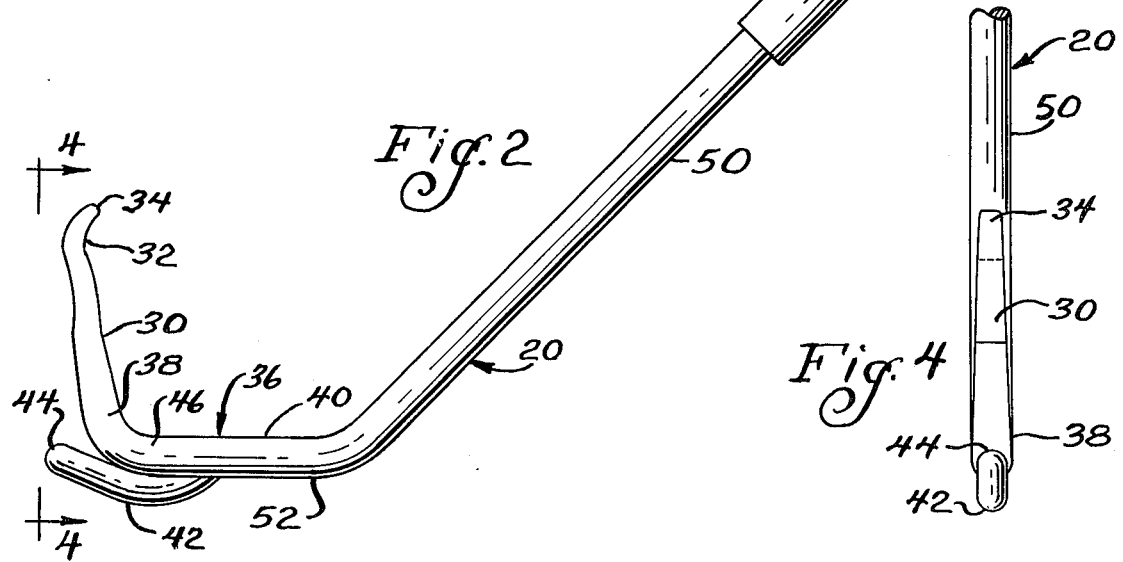

CAMBER AND CASTER ADJUSTMENT DEVICE

BACKGROUND OF THE INVENTION

The present invention relates in general to an adjustment device and in particular, to a novel camber and caster adjustment tool.

More specifically, this invention relates to a camber and caster adjustment device for use in vehicles to perform desired camber and caster adjustments of the wheels. During the normal operation of automobiles and the like, it is necessary to adjust periodically the wheel of the vehicle for both camber and caster. A caster adjustment of the wheel refers to adjusting the wheel with respect to its forward or rearward tilt of the top of the wheel spindle. On the other hand, camber is considered to be the amount that the front wheels are tilted at the top. It has been found that in certain new automobiles, particularly the Mustang II, it is particularly difficult to adjust the camber and caster of the wheels since the tools presently utilized for making such adjustments are not adapted for a quick and efficient alignment of the wheel assembly.

At the present, four separate tools are required for making camber and caster adjustments to the wheel assemblies of such a vehicle. The four tools each have a lower pin which must be inserted into recesses in the vehicle body, and bolts which are threaded through the tools must then be turned the proper amount for making the camber and caster adjustments. Thus, the present tools are unduly complicated and inconvenient in their use, and the excessive number of tools utilized for making the adjustments requires that special care be taken to assure that none of the tools are lost or mingled with other tools. Each of the present tools must be separately identified to indicate their proper location for use on the vehicle, and to verify that they are utilized on the proper vehicle. It is apparent that the present tools are not conducive to an efficient and rapid adjustment of the wheel assemblies, since they are not readily placed into operative position, and also require considerable time to perform the necessary adjustments.

SUMMARY OF THE INVENTION

It is, therefore, an object of this invention to improve the adjustment of a wheel assembly of a vehicle.

Another object of this invention is to improve the device utilized in effecting caster and camber adjustment of a wheel of a vehicle.

A further object of this invention is to reduce the cost and complexity of the device utilized in making camber and caster adjustments.

Still another object of this invention is to considerably reduce the time required for making camber and caster adjustments to the wheel assembly.

These and other objects are attained in accordance with the present invention wherein there is provided a camber and caster adjustment device for contacting an end of the inner shaft of a wheel assembly for adjustment thereof. The device includes a contact member for contacting the wheel assembly, and a fulcrum member extending from an end of the contact member at an obtuse angle to the contact member. An elongated handle extends from an end of the fulcrum member remote the contact member for manipulation of the device.

The fulcrum member is placed in position on a ledge of the vehicle frame which serves as a fulcrum point, and the handle is moved to apply camber and caster adjustment forces by the contact member to the wheel assembly. Thus, only one tool of simplified construction is required for making the camber and caster adjustments, and adjustments are made to the wheel assembly in a simplified manner since the device of the present invention is readily placed in position for use and is easily manipulated by movement of its handle.

DESCRIPTION OF THE DRAWINGS

Further objects of the invention, together with additional features contributing thereto and advantages accruing therefrom, will be apparent from the following description of an embodiment of the invention when read in conjunction with the accompanying drawings, wherein:

FIG. 1 is a perspective view of the camber and caster adjustment device of the present invention in operative position on the rear of a right front vehicle wheel assembly;

FIG. 2 is an elevational view of the adjustment device of the present invention;

FIG. 3 is an elevational view of the adjustment device taken from the front of the device of FIG. 2;

FIG. 4 is a fragmentary elevational view of the adjustment device taken substantially as indicated along the line 4—4 of FIG. 2.

DESCRIPTION OF THE PREFERRED EMBODIMENTS

Figure 5:
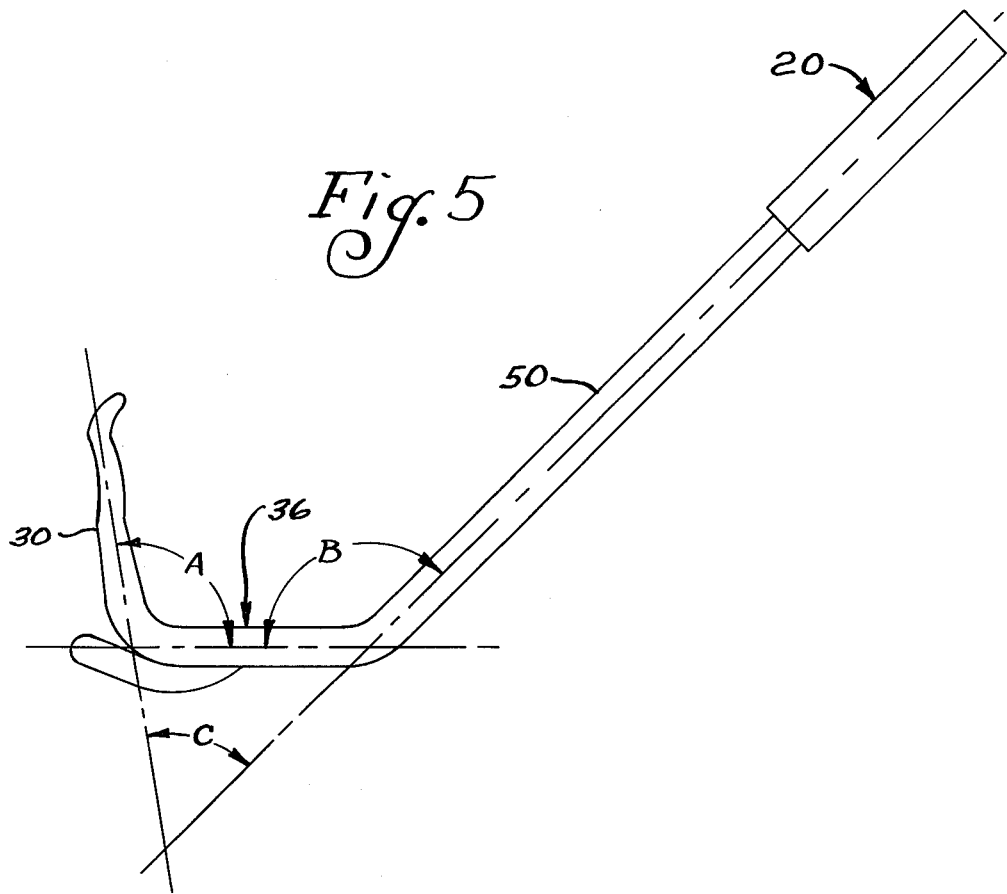
FIG. 5 is a diagrammatic view illustrating the relationship between a contact member, a fulcrum member, and a handle of the device of FIG. 2.

Referring now to FIG. 1, there is shown an embodiment of the caster and camber adjustment device generally designated 20 of the present invention in operative position on a wheel assembly 22 which is attached to a vehicle chassis 24. The wheel assembly of a vehicle such as a Mustang II includes an upper inner shaft or arm 26 which is generally attached to the vehicle body by means of a pair of bolts (not shown) which affix the shaft and wheel assembly to the vehicle body.

As shown in FIGS. 2–5, the adjustment device 20 includes an elongated contact member 30 having a recessed portion 32 adjacent one of its ends 34. A fulcrum member designated generally 36 extends from the other end 38 of the contact member 30. The fulcrum member 36 has a fulcrum rod 40 which is connected to the contact member 30, and which defines an angle A with the contact member 30. The fulcrum member 36 also has a heel member 42 which extends outwardly from the fulcrum rod 40 on the opposite side of the rod relative the contact member 30. The heel member 42 extends along the fulcrum rod 40, and has a rounded end portion 44 which extends past the end 46 of the fulcrum rod 40 adjacent the contact member 30.

The adjustment device 20 also has an elongated handle 50 which extends from the other end 52 of the fulcrum rod 40, and which defines an obtuse angle B with the fulcrum rod 40. In a preferred embodiment, the handle 50, fulcrum rod 40, and contact member 30 are generally disposed in a plane, as best illustrated in FIG. 3. Also, the handle 50, fulcrum rod 40, and contact member 30 are preferably integral and formed from an integral elongated rod for ease of manufacture. The handle 50 may have an outer gripping member 54, such as a rubber sleeve, positioned on its outer end 56 relative the fulcrum rod 40 to facilitate manipulation of the handle by a user.

Although it is understood that the angles A and B shown in FIG. 5 and defined by the contact member 30, fulcrum rod 40, and handle 50 may be suitably modified for convenience of use, it has been found that the angle A defined by the contact member 30 and fulcrum rod 40 is preferably an obtuse angle, and particularly excellent results have been achieved for an adjustment device having an angle A of approximately 97° and an angle B of approximately 135°. It will be seen from FIG. 5 that the angle C defined between the contact member 30 and handle 50 for the preferred relationship of the structure is an acute angle, and for the particular example described above is approximately 52 degrees.

In use of the device of the present invention, as illustrated in FIG. 1, the heel member 42 of the fulcrum member 36 is positioned on a ledge 60 of the vehicle frame with the end portion 44 of the heel member 42 abutting against a wall 62 of the vehicle. The handle 50 is then lowered with the fulcrum member 36 in position on the ledge until the recessed portion 32 of the contact member 30 engages one end of the upper arm or shaft 26 of the wheel assembly. The bolt (not shown) located adjacent the end of the shaft 26 where the contact member 30 is located is loosened in an amount to free that end of the shaft. The bolt (not shown) on the other end of the shaft 26 is then loosened to permit free movement of the shaft for corrective adjustment. The adjustment is accomplished with the bolts loosened by applying downward lifting pressure on the handle 50, such that the contact member 30 moves about the fulcrum member 36 with the ledge 60 serving as a fulcrum point, and adjustment forces are then applied by the contact member 30 to move the shaft or arm 26 the desired amount. Once the adjustment has been completed, the bolts associated with the shaft 26 may be tightened to secure the shaft to the vehicle body.

Thus, a new and improved adjustment device has been described which permits a more efficient and simplified camber and caster adjustment of the vehicle wheel assembly. The desired adjustments are readily accomplished by merely placing the fulcrum member of the device in the proper location on the vehicle, and by applying pressure to the handle. The adjustments which are made to the various parts of the wheel assembly are accomplished with a single tool, and it is unnecessary to maintain a stock of tools, as previously required.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation and material to the teachings of the invention without departing from its essential teachings.

What is claimed is:

1. A camber and caster adjustment device for making camber and caster adjustments of a vehicle wheel assembly, comprising:
   contact means for contacting a portion of the wheel assembly;
   fulcrum means connected to and disposed at an oblique angle to said contact means having a curved lower surface for placement on a fulcrum point of the vehicle said fulcrum means including an elongated rod, said elongated rod having a portion extending outwardly therefrom and past the contact means adjacent said elongated rod; and
   handle means connected to said fulcrum means for moving the contact means about the fulcrum means on the fulcrum point and applying camber and caster adjustment forces by the contact means to the wheel assembly.

2. The adjustment device of claim 1 wherein said contact means comprises an elongated rod having an end portion remote from the fulcrum means including a recess for contacting the wheel assembly.

3. The adjustment device of claim 1 wherein said handle means is disposed at an angular relationship to the fulcrum and contact means, and in which said handle, fulcrum and contact means are generally planar.

4. A camber and caster adjustment device for making camber and caster adjustments to a vehicle wheel assembly, comprising:
   an elongated contact member having a recessed portion adjacent one end for contacting a portion of the wheel assembly;
   a fulcrum means including an elongated fulcrum rod extending from the other end of the contact member at an obtuse angle to the contact member, and a heel member extending outwardly from and along the fulcrum rod on the opposite side of the rod relative the contact member, past the end of the fulcrum rod adjacent the contact member; and
   an elongated handle extending from an end of the fulcrum rod remote the contact member and extending at an obtuse angle from the fulcrum rod, said handle being generally disposed in a plane defined by the contact member and the fulcrum rod, said handle being moved with the heel member positioned on a fulcrum point of the vehicle to apply camber and caster adjustment forces by the contact member to the wheel assembly.

5. The adjustment device of claim 4 wherein said contact member, fulcrum rod and handle are integral.

6. The adjustment device of claim 4 wherein the angle defined by the contact member and fulcrum rod is approximately 97°.

7. The adjustment device of claim 4 wherein the angle defined by the fulcrum rod and the handle is approximately 135°.

8. The adjustment device of claim 4 wherein the end of said handle remote the fulcrum member includes an outer gripping member.

9. A camber and caster adjustment device for making camber and caster adjustments to a vehicle wheel assembly, comprising:
   an elongated contact member having an end portion for contacting a portion of the wheel assembly;
   an elongated handle defining a acute angle with the contact member and being generally disposed in a planar relationship to the contact member; and
   a fulcrum member extending between the contact member and the handle, said handle being moved with the fulcrum member positioned on a fulcrum point of the vehicle to apply camber and caster adjustment forces by the contact member to the wheel assembly, said fulcrum member having a portion extending outwardly therefrom and past the elongated contact member adjacent said fulcrum member.

10. The adjustment device of claim 9 wherein the angle defined by the contact member and handle is approximately 52°.

* * * * *